US008598094B2

(12) United States Patent
Welton et al.

(10) Patent No.: US 8,598,094 B2
(45) Date of Patent: Dec. 3, 2013

(54) METHODS AND COMPOSTIONS FOR PREVENTING SCALE AND DIAGENEOUS REACTIONS IN SUBTERRANEAN FORMATIONS

(75) Inventors: Thomas D. Welton, Duncan, OK (US); Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 81 days.

(21) Appl. No.: 11/998,733

(22) Filed: Nov. 30, 2007

(65) Prior Publication Data
US 2009/0143258 A1   Jun. 4, 2009

(51) Int. Cl.
*C09K 8/58* (2006.01)
*C09K 8/24* (2006.01)
*C09K 8/60* (2006.01)
*C09K 8/528* (2006.01)

(52) U.S. Cl.
USPC ............ 507/221; 507/117; 507/219; 507/224

(58) Field of Classification Search
USPC .................................. 507/117, 219, 221, 224
See application file for complete search history.

(56) References Cited

U.S. PATENT DOCUMENTS

| | | |
|---|---|---|
| 3,163,212 A | 12/1964 | Bermard |
| 3,323,595 A | 6/1967 | Knox et al. |
| 3,343,599 A | 9/1967 | Eddins, Jr. et al. |
| 3,437,145 A | 4/1969 | Johnson et al. |
| 3,438,443 A | 4/1969 | Prats et al. |
| 3,443,637 A | 5/1969 | Bond et al. |
| 3,704,750 A | 12/1972 | Miles et al. |
| 3,782,469 A | 1/1974 | Fulford |
| 3,815,680 A | 6/1974 | McGuire et al. |
| 4,074,536 A | 2/1978 | Young |
| 4,232,740 A | 11/1980 | Park |
| 4,323,124 A | 4/1982 | Swan |
| 4,425,384 A | 1/1984 | Brownscombe |
| 4,427,068 A | 1/1984 | Fitzgibbon |
| 4,432,881 A | 2/1984 | Evani |
| 4,454,914 A | 6/1984 | Watanabe |
| 4,460,627 A | 7/1984 | Weaver et al. |
| 4,475,595 A | 10/1984 | Watkins et al. |
| 4,487,867 A | 12/1984 | Almond et al. |
| 4,572,296 A | 2/1986 | Watkins |
| 4,579,176 A | 4/1986 | Davies et al. |
| 4,582,137 A | 4/1986 | Schmitt |
| 4,585,064 A | 4/1986 | Graham et al. |
| 4,606,227 A | 8/1986 | Walters |
| 4,681,854 A | 7/1987 | Feazel |
| 4,741,400 A | 5/1988 | Underdown |
| 4,814,096 A | 3/1989 | Evani |
| 4,838,351 A | 6/1989 | Jennings, Jr. et al. |
| 4,892,147 A | 1/1990 | Jennings, Jr. et al. |
| 4,898,750 A | 2/1990 | Friedman et al. |
| 4,913,236 A | 4/1990 | Reed |
| 4,922,758 A | 5/1990 | Penny |
| 4,997,582 A | 3/1991 | Clark, Jr. et al. |
| 5,042,581 A | 8/1991 | Jennings, Jr. et al. |
| 5,211,235 A | 5/1993 | Shu et al. |
| 5,240,075 A | 8/1993 | Burrows et al. |
| 5,249,627 A | 10/1993 | Harms et al. |
| 5,277,823 A | 1/1994 | Hann et al. |
| 5,393,439 A | 2/1995 | Laramay et al. |
| 5,529,125 A | 6/1996 | Di Lullo Arias et al. |
| 5,558,171 A | 9/1996 | McGlothlin et al. |
| 5,582,249 A | 12/1996 | Caveny et al. |
| 5,604,184 A | 2/1997 | Ellis et al. |
| 5,721,313 A | 2/1998 | Young et al. |
| 5,775,425 A | 7/1998 | Weaver et al. |
| 5,787,986 A | 8/1998 | Weaver et al. |
| 5,833,000 A | 11/1998 | Weaver et al. |
| 5,839,510 A | 11/1998 | Weaver et al. |
| 5,853,048 A | 12/1998 | Weaver et al. |
| 5,867,549 A | 2/1999 | Lindquist et al. |
| 6,069,108 A | 5/2000 | Ernst et al. |
| 6,070,664 A | 6/2000 | Dalrymple et al. |
| 6,153,106 A | 11/2000 | Kelley et al. |
| 6,311,773 B1 * | 11/2001 | Todd et al. .................. 166/280.2 |
| 6,439,309 B1 | 8/2002 | Matherly et al. |
| 6,461,518 B1 | 10/2002 | Demadis et al. |
| 6,476,169 B1 | 11/2002 | Eoff et al. |
| 6,531,427 B1 | 3/2003 | Shuchart et al. |
| 6,547,871 B2 | 4/2003 | Chatterji et al. |

(Continued)

FOREIGN PATENT DOCUMENTS

| | | |
|---|---|---|
| CA | 2 198 812 | 8/1998 |
| CA | 2 509 115 A1 | 12/2005 |

(Continued)

OTHER PUBLICATIONS

Sunco Technical data sheet of polyacrylate.*
Journal of Polymer Science, vol. 52, p. 169-177, 1961.*
U.S. Appl. No. 10/864,618, filed Jun. 9, 2004, Blauch, et al.
U.S. Appl. No. 10/864,061, filed Jun. 9, 2004, Blauch, et al.
International Search Report and Written Opinion for PCT/GB2009/002423 dated Jan. 21, 2010.
Weaver et al., E & P Formation Mineralogy, Proppant Characteristics Drive Conductivity; Apr. 22, 2009; XP-002557372.
International Search Report and Written Opinion for PCT/GB2009/002415 dated Dec. 22, 2009.
International Search Report and Written Opinion for PCT/GB2009/002422 dated Jan. 21, 2010.
Ali, Syed A.; Sandstone Diagenesis, Applications to Hydrocarbon Exploration and Production; Gulf Science & Technology Company; Pittsburgh, PA; Geology & Interpertation Department; Department Report No. 4231R006; Dec. 1981.

(Continued)

*Primary Examiner* — Aiqun Li
(74) *Attorney, Agent, or Firm* — Robert A. Kent; McDermott Will & Emery LLP

(57) ABSTRACT

Methods and compositions useful to prevent scale formation and/or diageneous reactivity on mineral surfaces residing or to be placed in subterranean formations, are provided. In one embodiment, the methods comprise: providing an anionic polymer and a cationic surfactant; contacting a mineral surface with the anionic polymer and the cationic surfactant; and allowing the anionic polymer and the cationic surfactant to interact with each other, whereby a film is formed on at least a portion of the mineral surface.

15 Claims, No Drawings

(56) References Cited

U.S. PATENT DOCUMENTS

| | | | |
|---|---|---|---|
| 6,660,693 B2 | 12/2003 | Miller et al. | |
| 6,729,408 B2 | 5/2004 | Hinkel et al. | |
| 6,877,563 B2 | 4/2005 | Todd et al. | |
| 6,920,928 B1 | 7/2005 | Davies et al. | |
| 7,021,383 B2 | 4/2006 | Todd et al. | |
| 7,040,403 B2 | 5/2006 | Nguyen et al. | |
| 7,091,159 B2 | 8/2006 | Eoff et al. | |
| 7,114,568 B2 | 10/2006 | Eoff et al. | |
| 7,131,491 B2 | 11/2006 | Blauch et al. | |
| 7,159,656 B2 | 1/2007 | Eoff et al. | |
| 7,159,659 B2 | 1/2007 | Welton et al. | |
| 7,192,908 B2 | 3/2007 | Frenier et al. | |
| 7,201,844 B1 | 4/2007 | Hammen et al. | |
| 7,207,387 B2 | 4/2007 | Eoff et al. | |
| 7,216,705 B2 | 5/2007 | Saini et al. | |
| 7,216,707 B2 | 5/2007 | Eoff et al. | |
| 7,220,708 B2 | 5/2007 | Zamora et al. | |
| 7,273,099 B2 | 9/2007 | East, Jr. et al. | |
| 7,316,787 B2 | 1/2008 | Hendel et al. | |
| 7,347,264 B2 | 3/2008 | Nguyen | |
| 7,363,978 B2 | 4/2008 | Welton et al. | |
| 7,398,825 B2 | 7/2008 | Nguyen et al. | |
| 7,500,519 B2 | 3/2009 | Weaver et al. | |
| 7,552,771 B2 | 6/2009 | Eoff et al. | |
| 7,563,750 B2 | 7/2009 | Eoff et al. | |
| 7,589,048 B2 | 9/2009 | Eoff et al. | |
| 7,591,313 B2 | 9/2009 | Weaver et al. | |
| 7,595,283 B2 | 9/2009 | Eoff et al. | |
| 7,741,251 B2 | 6/2010 | Eoff et al. | |
| 7,759,292 B2 | 7/2010 | Eoff et al. | |
| 2003/0091467 A1 | 5/2003 | Kmec et al. | |
| 2003/0188872 A1 | 10/2003 | Nguyen et al. | |
| 2004/0074643 A1 | 4/2004 | Munoz et al. | |
| 2004/0209780 A1 | 10/2004 | Harris et al. | |
| 2004/0229756 A1 | 11/2004 | Eoff et al. | |
| 2005/0049151 A1 | 3/2005 | Nguyen et al. | |
| 2005/0070679 A1 | 3/2005 | Breuer et al. | |
| 2005/0079981 A1 | 4/2005 | Nguyen et al. | |
| 2005/0092489 A1 | 5/2005 | Welton et al. | |
| 2005/0107263 A1 | 5/2005 | Bland et al. | |
| 2005/0148721 A1 | 7/2005 | Tonapi et al. | |
| 2005/0150838 A1 | 7/2005 | Duke et al. | |
| 2005/0155796 A1 | 7/2005 | Eoff et al. | |
| 2005/0194135 A1 | 9/2005 | Nguyen et al. | |
| 2005/0194140 A1 | 9/2005 | Dalrymple et al. | |
| 2005/0199396 A1 | 9/2005 | Sierra et al. | |
| 2005/0244641 A1 | 11/2005 | Vincent | |
| 2005/0277554 A1* | 12/2005 | Blauch et al. | 507/224 |
| 2006/0035790 A1 | 2/2006 | Okell et al. | |
| 2006/0102345 A1 | 5/2006 | McCarthy et al. | |
| 2006/0118300 A1* | 6/2006 | Welton et al. | 166/276 |
| 2006/0137875 A1 | 6/2006 | Dusterhoft et al. | |
| 2006/0180309 A1 | 8/2006 | Welton et al. | |
| 2006/0180310 A1 | 8/2006 | Welton et al. | |
| 2006/0183646 A1 | 8/2006 | Welton et al. | |
| 2006/0260808 A1* | 11/2006 | Weaver et al. | 166/276 |
| 2006/0260810 A1 | 11/2006 | Weaver et al. | 166/278 |
| 2006/0260813 A1 | 11/2006 | Welton et al. | 166/280.2 |
| 2006/0264332 A1 | 11/2006 | Welton et al. | |
| 2006/0266522 A1 | 11/2006 | Eoff et al. | |
| 2006/0283592 A1 | 12/2006 | Sierra et al. | |
| 2007/0015669 A1 | 1/2007 | Zhang | |
| 2007/0039733 A1* | 2/2007 | Welton et al. | 166/276 |
| 2007/0079965 A1 | 4/2007 | Nguyen et al. | |
| 2007/0235189 A1 | 10/2007 | Milne et al. | |
| 2007/0281110 A1 | 12/2007 | Brown | |
| 2007/0289781 A1 | 12/2007 | Rickman et al. | |
| 2008/0011687 A1 | 1/2008 | Campo et al. | |
| 2008/0035339 A1 | 2/2008 | Welton et al. | |
| 2008/0035340 A1 | 2/2008 | Welton et al. | |
| 2008/0110812 A1 | 5/2008 | Jensen et al. | |
| 2008/0132711 A1 | 6/2008 | Poelker et al. | |
| 2008/0135245 A1 | 6/2008 | Smith et al. | |
| 2008/0277620 A1 | 11/2008 | Kesavan et al. | |
| 2008/0280789 A1 | 11/2008 | Welton et al. | |
| 2009/0111718 A1 | 4/2009 | Gadiyar et al. | |
| 2009/0143258 A1 | 6/2009 | Welton et al. | |
| 2009/0221454 A1 | 9/2009 | Welton et al. | |
| 2009/0233819 A1 | 9/2009 | Fuller et al. | |
| 2009/0271501 A1 | 10/2009 | Shenfield et al. | |
| 2009/0291863 A1 | 11/2009 | Welton et al. | |
| 2009/0312201 A1 | 12/2009 | Huang et al. | |
| 2010/0021552 A1 | 1/2010 | Hayes et al. | |
| 2010/0089578 A1 | 4/2010 | Nguyen et al. | |
| 2010/0089579 A1 | 4/2010 | Reyes et al. | |
| 2010/0093566 A1 | 4/2010 | Reyes et al. | |
| 2011/0079392 A1 | 4/2011 | Reyes | |
| 2011/0253374 A1 | 10/2011 | Reyes et al. | |

FOREIGN PATENT DOCUMENTS

| | | | | |
|---|---|---|---|---|
| CA | 2 545 563 | A1 | 11/2006 | |
| CA | 2 685 832 | A1 | 11/2008 | |
| EP | 0082657 | A2 | 6/1983 | |
| FR | 2858314 | | 2/2005 | |
| GB | 2298440 | A | 9/1996 | |
| WO | WO0051945 | | 9/2000 | |
| WO | WO 03/015523 | A2 | 2/2003 | |
| WO | WO 03/015523 | A2 | 2/2003 | |
| WO | WO 03/097996 | A1 | 11/2003 | |
| WO | WO 2004/096940 | A1 | 11/2004 | C09K 3/00 |
| WO | WO 2004/096940 | A1 | 11/2004 | |
| WO | WO 2004/104135 | A1 | 12/2004 | |
| WO | WO2005/1000007 | A2 | 10/2005 | |
| WO | WO 2006/123143 | A1 | 11/2006 | |
| WO | WO2007/013883 | A2 | 2/2007 | |
| WO | WO2007051167 | A3 | 5/2007 | |
| WO | WO 2007/091058 | A1 | 8/2007 | |
| WO | WO 2008/015464 | A1 | 2/2008 | |
| WO | WO 2008/094069 | A2 | 8/2008 | |
| WO | WO2009085377 | A1 | 7/2009 | |
| WO | WO 2010/041032 | A1 | 4/2010 | |

OTHER PUBLICATIONS

U.S. Appl. No. 12/573,999, filed Oct. 6, 2009, Nguyen et al.
U.S. Appl. No. 12/574,018, filed Oct. 6, 2009, Reyes et al.
U.S. Appl. No. 12/574,037, filed Oct. 6, 2009, Reyes et al.
U.S. Appl. No. 12/574,054, filed Oct. 6, 2009, Reyes et al.
SPE 51049-MS "Enhancing Unconventional Gas Development Economics Through Proppant Surface Modification," M.E. Blauch, Halliburton, W.K. Morrison, CMS Nomeco, J.G. Wilkinson, Ward Lake Energy, J. Minthorn, and J. Terracina, Halliburton, 1998 SPE Eastern Regional Meeting held in Pittsburgh, Pennsylvania, Nov. 9-11, 1998.
SPE 94666-MS "Sustaining Fracture Conductivity," J.D. Weaver, P.D. Nguyen, M.A. Parker, and D. van Batenburg, Halliburton, SPE European Formation Damage Conference held in Scheveningen, The Netherlands, May 25-27, 2005.
SPE 97659-MS "Controlling Formation Fines at Their Sources to Maintain Well Productivity," P.D. Nguyen, J.D. Weaver, R.D. Rickman, R.G. Dusterhoft, and M.A. Parker, Halliburton, SPE International Improved Oil Recovery Conference in Asia Pacific held in Kuala Lumpur, Malaysia, Dec. 5-6, 2005.
SPE 97659-PA "Controlling Formation Fines at Their Sources to Maintain Well Productivity," P.D. Nguyen, J.D. Weaver, R.D. Rickman, R.G. Dusterhoft, and M.A. Parker, Halliburton, SPE Intl Improved Oil Recovery Conf. in Asia Pacific, Kuala Lumpur, Malaysia, Dec. 5-6, 2005.
SPE 98236-MS "Sustaining Conductivity," J.D. Weaver, D.W. van Batenburg, M.A. Parker, and P.D. Nguyen, Halliburton, 2006 SPE International Symposium and Exhibition on Formation Damage Control held in Lafayette, LA Feb. 15-17, 2006.
SPE 98236-PA "Fracture-Related Diagenesis May Impact Conductivity," J. Weaver, M. Parker, D. van Batenburg, and P. Nguyen, Halliburton, 2006 SPE International Symposium and Exhibition on Formation Damage Control held in Lafayette, LA Feb. 15-17, 2006.
SPE 106815-MS "Surface Reactive Fluid's Effect on Shale," Bill Grieser, Halliburton; Bill Wheaton, Devon Energy Production Co., LP; Bill Magness, Williams Energy Services Co.; and Matt Blauch and Ray Loghry, Halliburton, 2007 SPE Production and Operations Symposium held in Oklahoma City, Oklahoma, U.S.A., Mar. 31-Apr. 3, 2007.

(56) References Cited

OTHER PUBLICATIONS

SPE 118174-MS "Fracture-Conductivity Loss Due to Geochemical Interactions Between Manmade Proppants and Formations," J. Weaver, R. Rickman, H. Luo, Halliburton, 2008 SPE Eastern Regional/AAPG Eastern Section Joint Meeting in Pittsburg, PA, Oct. 11-15, 2008.
SPE 118175-MS "Prevention of Geochemical Scaling in Hydraulically Created Fractures: Laboratory and Field Studies," P. Nguyen, J. Weaver and R. Rickman, Halliburton, 2008 SPE Eastern Regional/ AAPG Eastern Section Joint Meeting in Pittsburg, PA, Oct. 11-15, 2008.
SPE 121465-MS "A Study of Proppant Formation Reactions," J. Weaver, R. Rickman, H. Luo, R. Loghry, Halliburton, 2009 SPE International Symposium on Oilfield Chemistry held in the Woodlands, TX, Apr. 20-22, 2009.
Protex-All™ Scale Inhibitor brochure, Jan. 2008.
Scalechek® LP-55 Scale Inhibitor brochure, Jan. 2008.
Okoye et al, "Characterization of Formation Damage in Heavy Oil Formation During Steam Injection," SPE 19417, 1990.
Shuchart et al., "Improved Success in Acid Stimulations with a New Organic-HF System," SPE 36907, 1996.
Gdanski et al., "Advanced Sandstone Acidizing Designs Using Improved Radial Models," SPE 38597, 1997.
Stanely et al., "Matrix Acidizing Horizontal Gravel-Packed Wells for Fines Damage Removal," SPE 65519, 2000.
Wennberg et al., "Successful Mud Acid Stimulations Maintain Productivity in Gravelpacked Wells at Heidrun," SPE 68925, 2001.
Husen et al., "Chelating Agent-Based Fluids for Optimal Stimulation of High-Temperature Wells," SPE 77366, 2002.
Ali et al., "Stimulation of High-Temperature Sandstone Formations from West Africa with Chelating Agent-Based Fluids," SPE 93805, 2008.
Ali et al., "Effective Stimulation of High-Temperature Sandstone Formations in East Venezuela with a New Sandstone-Acidizing System," SPE 98318, 2006.
Xiao et al., "Reactive Transport Modeling of Carbonate and Siliciclastic Diagenesis and Reservoir Quality Prediction," SPE 101669, 2006.
Aboud et al., "Effective Matrix Acidizing in High-Temperature Environments," SPE 109818, 2007.
Falcone et al., "Oil and Gas Expertise for Geothermal Exploitation: The Need for Technology Transfer," SPE 113852, 2008.
Kerkar et al., "Assessment of Dynamic Filtration Formation Damage for Alaskan North Slope Drilling Fluids," SPE 114142, 2008.
Huang et al., "Using Nanoparticle Technology to Control Formation Fines Migration," SPE 115384, 2008.
Pedenaud et al., "A New Water Treatment Scheme for Thermal Development: The SIBE Process," SPE/PS/CHOA 117561, PS 2008-304, 2008.
Gomez et al., "Acid Stimulation of Geothermal Wells in Central America," SPE 121300, 2008.
Weaver et al., "A Study of Proppant-Formation Reactions," SPE 121465, 2009.
Neofotistou et al., "Silica Scale Inhibition by Polyaminoamide STARBURST® Dendrimers," Colloids and Surfaces A: Physicochem. Eng. Aspects 242 (2004) 213-216.
Mavredaki et al., "Inhibition and Dissolution as Dual Mitigation Approaches for Colloidal Silica Fouling and Deposition in Process Water Systems: Functional Synergies," Ind. Eng. Chem. Res. (2005), 44, 7019-7026.
Demadis et al., "Solubility Enhancement of Silicate with Polyamine/ Polyammonium Cationic Macromolecules: Relevance to Silica-Laden Process Waters," Ind. Eng. Chem. Res. (2006), 45, 4436-4440.
Demadis et al., "Industrial Water Systems: Problems, Challenges and Solutions for the Process Industries," Desalination(2007), 213, 38-46.
Demadis,et al., "Inhibitory Effects of Multicomponent, Phosphonate-Grafted, Zwitterionic Chitosan Biomacromolecules on Silicic Acid Condensation," Biomacromolecules (2008), 9, 3288-3293.

Stathoulopoulou et al., "Enhancement of Silicate Solubility by Use of 'Green' Additives: Linking Green Chemistry and Chemical Water Treatment," Desalination (2008), 224, 223-230.
Ketsetzi et al., "Being 'Green' in Chemical Water Treatment Technologies: Issues, Challenges and Developments," Desalination (2008), 223, 487-493.
Euvrard et al., "Influence of PPCA (Phosphinopolycarboxylic Acid) and DETPMP (Diethylenetriaminepentamethylenephosphonic Acid) on Silica Fouling," Desalination 205 (2007) 114-123.
Esumi et al., "Adsorption of Poly(Amidoamine) Dendrimers on Alumina/Water and Silica/Water Interfaces," Langmuir (1998), 14, 4466-4470.
Laird et al., "Elemental Recoveries for Clay Minerals Analysed by Inductively Coupled Plasma Atomic Emission Spectrometry Using Slurry Nebulisation," Journal of Analytical Atomic Spectrometry, vol. 5, (Sep. 1990).
Hamrouni et al., "Analytical Aspects of Silica in Saline Waters—Application to Desalination of Brackish Waters," Desalination 136 (2001) 225-232.
Strekopytov et al., "The Formation, Precipitation and Structural Characterisation of Hydroxyaluminosilicates Formed in the Presence of Fluoride and Phosphate," Polyhedron 24 (2005) 1585-1592.
Azaroual et al., "Solubility of Silica Polymorphs in Eletrolyte Solutions, I. Activity Coefficient of Aqueous Silica from 25° to 250° C., Pitzer's Parameterisation," Chemical Geology 140, (1997), 155-165.
Zhou et al., "Effect of Sodium Chloride on Gelatinization of Silicic Acid and the Formation of Novel Polysilicic Acid Crystals," Journal of Non-Crystalline Solids, 353 (2007), 2774-2778.
Nour et al., "Spectroscopic Evidence of Silica-Lignin Complexes: Implications for Treatment of Non-Wood Pulp Wastewater," Water Science and Technology, vol. 50, No. 3, pp. 157-166, 2004.
Chen et al., "Influence of Catechin on Precipitation of Aluminum Hydroxide," ScienceDirect Geoderma 152 (2009), 296-300.
Ohman et al., "Equilibrium and Structural Studies of Silicon (IV) and Aluminum (III) in Aqueous Solution. 28. Formation of Soluble Silicic Acid-Ligand Complexes as Studied by Potentiometric and Solubility Measurements," Department of Inorganic Chemistry, University of Umea, S-901 87, pp. 335-341, 1990.
Pokrovski et al., "Experimental Study of the Complexation of Silicon and Germanium with Aqueous Organic Species: Implications for Germanium and Silicon Transport and Ge/Si Ratio in Natural Waters," Geochimica et Cosmochimica Acta, vol. 62, No. 21/22, pp. 3413-3428, 1998.
Dhar et al., "Six-Coordinate Silicon (IV). The Hydrolysis and Racemization of the Tris-(Acetylacetonato)-Silicon (IV) Cation," Department of Chemistry, Wayne State University, vol. 81, 1959.
Gorrepati et al., "Silica Precipitation in Acidic Solutions: Mechanism, pH Effect, and Salt Effect," Langmuir, American Chemical Society, 2010.
Sedeh et al., "Equilibrium and Structural Studies of Silicon (IV) and Aluminum (III) in Aqueous Solution. 30. Aqueous Complexation Between Silicic Acid and Some Ortho-Di and Triphenolic Compounds," Department of Inorganic Chemistry, University of Umea, S-901 87, pp. 933-940, 1992.
Gorrepati, "Silica Precipitation from Analcime Dissolution," A Dissertation Submitted in Partial Fulfillment of the Requirements for the Degree of Doctor of Philosophy (Chemical Engineering) in the University of Michigan, 2009.
International Preliminary Report on Patentabiilty for PCT/GB2009/ 002415 dated Apr. 21, 2011.
Communication for International Patent Application No. PCT/ GB2009/002424 dated Mar. 3, 2010.
"Fracture-Related Diagenesis May Impact Conductivity," J. Weaver, M. Parker, D. van Batenburg, and P. Nguyen, Halliburton, 2006 SPE International Symposium and Exhibition on Formation Damage Control held in Lafayette, LA Feb. 15-17, 2006; revised manuscript received Jan. 16, 2007.
International Search Report and Written Opinion for PCT/GB2009/ 002424 dated May 18, 2010.
Office Action for U.S. Appl. No. 12/574,018 dated Jul. 7, 2011.
International Search Report for Patent Application No. PCT/ GB2009/002424 dated Jul. 1, 2010.

(56) References Cited

OTHER PUBLICATIONS

International Search Report and Written Opinion for PCT/GB2011/001547 dated Feb. 6, 2012.
Official Action for Canadian Patent Application No. 2,738,978 dated May 29, 2012.
SPE 130641 Weaver et al., "Productivity Impact from Geochemical Degradation of Hydraulic Fractures," Society of Petroleum Engineers, 2010.
SPE 150669 Raysoni et al., "Long-Term Proppant Performance," Society of Petroleum Engineers, 2012.

* cited by examiner

METHODS AND COMPOSTIONS FOR PREVENTING SCALE AND DIAGENEOUS REACTIONS IN SUBTERRANEAN FORMATIONS

BACKGROUND

The present invention relates to methods and compositions that may be useful in treating subterranean formations, and more specifically, to methods and compositions that may be useful to prevent scale formation and/or diageneous reactivity on mineral surfaces residing or to be placed in subterranean formations.

In the production of hydrocarbons from a subterranean formation, it is sometimes desirable that the subterranean formation be sufficiently conductive to permit the flow of desirable fluids to a well bore penetrating the formation. In some cases, hydraulic fracturing treatments and/or acidizing treatments may be used to increase the conductivity of a subterranean formation. In hydraulic fracturing operations, a treatment fluid (e.g., a fracturing fluid or a "pad" fluid) is pumped into a well bore that penetrates a subterranean formation at a sufficient hydraulic pressure to create or enhance one or more pathways, or "fractures," in the subterranean formation. The fluid used in the treatment may comprise particulates, often referred to as "proppant particulates," that are deposited in the resultant fractures, to prevent the fractures from fully closing upon the release of hydraulic pressure, e.g., by forming a proppant pack and conductive channels through which fluids may flow to a well bore.

It is also sometimes desirable to prevent the migration of unconsolidated particulates, formation sands, and formation fines into the well bore. To this end, gravel-packing treatments may be used wherein a treatment fluid suspends a plurality of particulates (commonly referred to as "gravel particulates") for delivery to a desired area in a well bore, e.g., near unconsolidated or weakly-consolidated formation zones, to form a gravel pack that may, inter alia, reduce the migration of particulates, formation sands, and formation fines into the well bore. One common type of gravel-packing operation involves placing a sand control screen in the well bore and packing the annulus between the screen and the well bore with the gravel particulates of a specific size to prevent the passage of formation sand. The gravel particulates act, inter alia, to prevent the formation particulates from occluding the screen or migrating with the produced hydrocarbons, and the screen acts, inter alia, to prevent the particulates from entering the production tubing in the well bore. Once the gravel pack is substantially in place, the viscosity of the treatment fluid may be reduced, inter alia, to facilitate its recovery. In some situations, fracturing and gravel-packing treatments may be combined into a single treatment (commonly referred to as "frac pack" operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

One problem that may negatively impact conductivity of a subterranean formation, even where fracturing and/or gravel packing operations have been performed, is the formation of scales on mineral surfaces in a subterranean formations. Water or aqueous treatment fluids used in subterranean operations (e.g., drilling fluids, fracturing fluids, gravel packing fluids, etc.) may contain ionized scale-forming compounds that precipitate on surfaces in subterranean formations, for example, surfaces of proppant particulates, gravel particulates, and other surfaces present where those treatment fluids are used. This scale formation may cause numerous problems, including the restriction of fluid flow through the subterranean formation. Some scales may be removed by introducing a solvent or an acidic fluid into the subterranean formation and allowed to dissolve scale on surfaces therein. However, certain types of scale may be resistant to removal with certain kinds of solvents. Moreover, certain acidic fluids may corrode portions of the formation or equipment and tubing present in the subterranean formation, dissolve and/or damage acid-soluble portions of the subterranean formation itself, generate toxic substances (e.g., $H_2S$) in the formation, and/or be hazardous to handle or transport.

Another problem that may negatively impact conductivity of a subterranean formation is the tendency of mineral sediments in a formation to undergo chemical reactions caused, at least in part, by conditions created by mechanical stresses on those minerals (e.g., fracturing of mineral surfaces, compaction of mineral particulates). One type of these stress-activated reactions includes diageneous reactions. As used herein, the terms "diageneous reactions" and "diageneous reactivity" are defined to include chemical and physical processes that move a portion of a mineral sediment and/or convert the mineral sediment into some other mineral form in the presence of water. Any mineral sediment may be susceptible to these diageneous reactions, including silicate minerals (e.g., quartz, feldspars, clay minerals), carbonaceous minerals, and metal oxide minerals. Thus, formation sands, proppant particulates, gravel particulates, and any other mineral surfaces found in a subterranean formation may be susceptible to diageneous reactivity. The conversion and movement of mineral sediments on these surfaces may, among other things, decrease the ability of fluids to flow around those surfaces. In some cases, fracturing and gravel-packing treatments may increase diageneous reactivity, for example, by forming new mineral surfaces in newly-created fractures and/or by introducing proppant or gravel particulates that comprise additional mineral surfaces into the subterranean formation that may be even more susceptible to diageneous reactivity than the mineral surfaces naturally-occurring in the subterranean formation.

SUMMARY

The present invention relates to methods and compositions that may be useful in treating subterranean formations, and more specifically, to methods and compositions that may be useful to prevent scale formation and/or diageneous reactivity on mineral surfaces residing or to be placed in subterranean formations.

In one embodiment, the present invention provides methods comprising: providing an anionic polymer and a cationic surfactant; contacting a mineral surface with the anionic polymer and the cationic surfactant; and allowing the anionic polymer and the cationic surfactant to interact with each other to form a film on at least a portion of the mineral surface.

In another embodiment, the present invention provides methods comprising: providing a treatment fluid that comprises a base fluid, an anionic polymer, and a cationic surfactant; contacting a mineral surface in a subterranean formation with the anionic polymer and the cationic surfactant; and allowing the anionic polymer and the cationic surfactant to interact with each other to form a film on at least a portion of the mineral surface in the subterranean formation.

In another embodiment, the present invention provides methods comprising: providing a treatment fluid that comprises a base fluid, an anionic polymer that comprises at least one polyacrylate, and a cationic surfactant, wherein the anionic polymer is present in an amount from about 2% to about 5% by weight of the treatment fluid; contacting a mineral surface with the anionic polymer and the cationic surfactant; allowing the anionic polymer and the cationic surfactant to interact with each other to form a film on at least a portion of the mineral surface; and allowing at least a portion of the film to dissolve.

In another embodiment, the present invention provides a pre-coated particulate for use in a subterranean operation, the pre-coated particulate comprising: a particulate; and a film coated onto a surface of the particulate, wherein the film is formed by allowing an anionic polymer and a cationic surfactant to contact the surface of the particulate, and allowing the anionic polymer and the cationic surfactant to interact with each other.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions that may be useful in treating subterranean formations, and more specifically, to methods and compositions that may be useful to prevent scale formation and/or diageneous reactivity on mineral surfaces residing or to be placed in subterranean formations.

The methods of the present invention comprise treating a mineral surface. As used herein, the term "mineral surface" and derivatives of that term refer to any surface wherein one or more minerals reside on that surface. These minerals may comprise any mineral found in subterranean formations, gravel particulates, and/or proppant particulates, including silicate minerals (e.g., quartz, feldspars, clay minerals), carbonaceous minerals, and metal oxide minerals. These mineral surfaces may be present, among other places, on formation sands, rock matrices, and "fracture faces" (i.e., surfaces in the formation that are created by creating or enhancing one or more fractures in the formation) that are found in the subterranean formation, proppant particulates or gravel particulates that have been placed within the subterranean formation, and/or proppant particulates or gravel particulates that are to be used in a subterranean operation.

At least in some embodiments, the methods of the present invention comprise: providing an anionic polymer and a cationic surfactant; contacting a mineral surface with the anionic polymer and the cationic surfactant; and allowing the anionic polymer and the cationic surfactant to interact, whereby a film is formed on at least a portion of the mineral surface. The term "anionic polymer" is defined herein to include any polymeric material that comprises and/or dissociates to form a negatively-charged portion. The term "cationic surfactant" is defined herein to include any surfactant known in the art that comprises and/or dissociates to form a positively-charged hydrophilic portion. The term "film" is defined herein to refer to a layer of any length, having any thickness, and may or may not be uniform in structure and/or composition over any particular length. The film formed on the mineral surface may, inter alia, prevent the formation of scales (e.g., gypsum, calcium carbonate, and barium sulfate) on or near the mineral surface, reduce diageneous reactivity on the mineral surface, and/or inhibit corrosion of the mineral surface.

The anionic polymers used in the present invention may comprise any polymeric material that comprises and/or dissociates to form a negatively-charged portion. Examples of anionic polymers that may be suitable for use in the present invention include, but are not limited to polyacrylamide and alkylpolyacrylamides, copolymers of polyacrylamide and alkylpolyacrylamides with ethylene, propylene and styrene, polymaleic anhydride, polyacrylates (e.g., polymethylacrylate), polyacrylic acid, 2-acrylamido-2-methylpropanesulfonic acid, any copolymers thereof, and any derivatives thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "derivative" also includes copolymers, terpolymers, and oligomers of the listed compound. An example of a commercially-available source of anionic polymers that may be suitable in certain embodiments of the present invention is SCALECHEK LP-55™, available from Halliburton Energy Services, Duncan, Okla. Other sources of anionic polymers that also may be suitable include modified polyacrylic acids, salts of modified polyacrylic acid, sodium salts of modified polyacrylic acid, sulphonated polyacrylic acid, and any derivatives thereof. Examples include DEQUEST® P 9020 and DEQUEST® P9030, both available from Solutia, Inc., St. Louis, Mo. Certain anionic polymers may be incompatible with certain cationic surfactants, minerals present on the mineral surface, and/or other elements in a treatment fluid and/or subterranean formation present in a particular application of the present invention. A person of ordinary skill in the art, with the benefit of this disclosure, will be able to select an anionic polymer that is compatible with these elements.

In certain embodiments, the anionic polymer(s) may be provided in an additive that further comprises, among other things, the cationic surfactant. This additive then may be added to a base fluid to form a treatment fluid of the present invention. In certain embodiments, the anionic polymer(s) may be present in a treatment fluid used in the present invention in an amount from about 0.05% to about 5% by weight of the treatment fluid. In certain embodiments, the anionic polymer(s) may be present in a treatment fluid used in the present invention in an amount from about 0.5% to about 5% by weight of the treatment fluid. In certain embodiments, the anionic polymer(s) may be present in a treatment fluid used in the present invention in an amount from about 0.5% to about 3% by weight of the treatment fluid. In certain embodiments, the anionic polymer(s) may be present in a treatment fluid used in the present invention in an amount from about 1% to about 5% by weight of the treatment fluid. In certain embodiments, the anionic polymer(s) may be present in a treatment fluid used in the present invention in an amount from about 2% to about 5% by weight of the treatment fluid. In certain embodiments, the anionic polymer(s) may be present in a treatment fluid used in the present invention in an amount from about 2% to about 3% by weight of the treatment fluid. A person of ordinary skill in the art, with the benefit of this disclosure, will recognize the amount of the anionic polymer that should be included in a particular application of the present invention based on, among other things, the amount of the cationic surfactant included, the desired thickness of the film to be formed on the mineral surface, and/or the area of the mineral surface to be treated.

The cationic surfactants used in the present invention may comprise any surfactant known in the art that comprises and/or dissociates to form a positively-charged hydrophilic portion. Examples of cationic surfactants that may be suitable for use in the present invention include, but are not limited to trimethylcocoammonium chloride, trimethyltallowammonium chloride, dimethyldicocoammonium chloride, bis(2-hydroxyethyl)tallowamine, bis(2-hydroxyethyl)erucylamine, erucyl methyl bis(2-hydroxyethyl) ammonium chloride, bis(2-hydroxyethyl)coco-amine, cetylpyridinium chloride, N,N,N,trimethyl-1-octadecamonium chloride, fatty amine salts, ammonium salts, quaternary ammonium compounds (e.g., alkyl quaternary ammonium salts), alkyl pyridinium salts, and any derivatives thereof. An example of a commercially-available cationic surfactant that may be suitable in certain embodiments of the present invention is 19N™ surfactant, available from Halliburton Energy Services, Duncan, Okla. Certain cationic surfactants may be incompatible or undesirable to use with certain anionic polymers, minerals present on the mineral surface, and/or other elements or conditions in a treatment fluid (e.g., pH) and/or subterranean formation present in a particular application of the present invention. A person of ordinary skill in the art, with the benefit of this disclosure, will be able to select a cationic surfactant that is compatible with these elements.

In certain embodiments, the cationic surfactant(s) may be provided in an additive that further comprises, among other things, the anionic polymer. This additive, then may be added to a base fluid to form a treatment fluid of the present invention. In certain embodiments, the cationic surfactant(s) may be present in a treatment fluid used in the present invention in an amount from about 0.05% to about 5% by weight of the treatment fluid. In certain embodiments, the cationic surfactant(s) may be present in a treatment fluid used in the present invention in an amount from about 0.5% to about 5% by weight of the treatment fluid. In certain embodiments, the cationic surfactant(s) may be present in a treatment fluid used in the present invention in an amount from about 0.5% to about 3% by weight of the treatment fluid. In certain embodiments, the cationic surfactant(s) may be present in a treatment fluid used in the present invention in an amount from about 1% to about 5% by weight of the treatment fluid. In certain embodiments, the cationic surfactant(s) may be present in a treatment fluid used in the present invention in an amount from about 2% to about 5% by weight of the treatment fluid. In certain embodiments, the cationic surfactant(s) may be present in a treatment fluid used in the present invention in an amount from about 2% to about 3% by weight of the treatment fluid. A person of ordinary skill in the art, with the benefit of this disclosure, will recognize the amount of the cationic surfactant that should be included in a particular application of the present invention based on, among other things, the amount of the anionic polymer included, the desired thickness of the film to be formed on the mineral surface, and/or the area of the mineral surface to be treated.

In certain embodiments, the anionic polymer and/or the cationic surfactant may be provided as a mixture, or they may be provided in a treatment fluid of the present invention that comprises a base fluid and the anionic polymer and/or the cationic surfactant. As used herein, the term "treatment fluid" refers to any fluid that may be used in an application in conjunction with a desired function and/or for a desired purpose. The term "treatment" does not imply any particular action by the fluid or any component thereof.

Treatment fluids suitable for use in certain embodiments of the present invention may take on a variety of physical forms, including aqueous gels, viscoelastic surfactant gels, oil gels, foamed gels, and emulsions. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In certain embodiments of the present invention, the treatment fluids are aqueous gels comprised of water, a gelling agent for gelling the water and increasing its viscosity, and, optionally, a crosslinking agent for crosslinking the gel and further increasing the viscosity of the treatment fluid. The increased viscosity of the gelled, or gelled and cross-linked, treatment fluid, inter alia, may reduce fluid loss and/or allow the treatment fluid to transport increased quantities of proppant particulates.

The base fluid in a treatment fluid of the present invention may comprise any fluid that does not adversely interact with the other components used in accordance with this invention. For example, the base fluid may be an aqueous fluid, a non-aqueous fluid (e.g., mineral oils, synthetic oils, esters, etc.), a hydrocarbon-based fluid (e.g., kerosene, xylene, toluene, diesel, oils, etc.), a foamed fluid (e.g., a liquid that comprises a gas), and/or a gas (e.g., nitrogen or carbon dioxide). Aqueous base fluids that may be suitable for use in certain embodiments of the treatment fluids of the present invention may comprise fresh water, saltwater (e.g., water containing one or more salts dissolved therein), brine, and/or seawater. Generally, the water may be from any source, provided that it does not contain components that might adversely affect the stability and/or performance of the treatment fluids of the present invention. In certain embodiments, the density of the aqueous base fluid can be adjusted, among other purposes, to provide additional particle transport and suspension in the treatment fluids of the present invention. In certain embodiments, the pH of the aqueous base fluid may be adjusted (e.g., by a buffer or other pH adjusting agent), among other purposes, to reduce the viscosity of the treatment fluid (e.g., activate a breaker or other additive). In these embodiments, the pH may be adjusted to a specific level, which may depend on, among other factors, the types of surfactants, gelling agents, anionic polymers, and other additives included in the treatment fluid. One of ordinary skill in the art, with the benefit of this disclosure, will recognize when such density and/or pH adjustments are appropriate.

The treatment fluids used in certain embodiments of the present invention optionally may comprise any number of additional additives, including, but not limited to, salts, additional surfactants (e.g., non-ionic surfactants), fluid loss control additives, acids, gases (e.g., nitrogen, carbon dioxide), surface modifying agents, tackifying agents, foamers, corrosion inhibitors, additional scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, and coating enhancement agents. A person of ordinary skill in the art, with the benefit of this disclosure, will recognize when such optional additives should be included in a treatment fluid used in the present invention, as well as the appropriate amounts of those additives to include.

The present invention may be used in any operation where it is desirable to prevent scale formation, diageneous reactivity, and/or corrosion on mineral surfaces residing or to be placed within the subterranean formation. Those mineral surfaces may be present, among other places, on the surface of formation sands, rock matrix, and fracture faces that are found in a subterranean formation, proppant particulates or gravel particulates that have been placed within a subterranean formation, and/or proppant particulates or gravel particulates that are to be used in a concurrent or subsequent subterranean operation.

In certain embodiments, the methods of the present invention may be used to treat a mineral surface already present within the subterranean formation. In these embodiments, the present invention may be used prior to, during, or subsequent to a variety of subterranean operations known in the art. Examples of such operations include drilling operations, pre-pad treatments, fracturing operations, perforation operations, preflush treatments, afterflush treatments, sand control treatments (e.g., gravel packing), acidizing treatments (e.g., matrix acidizing or fracture acidizing), "frac-pack" treatments, and well bore clean-out treatments. For example, certain embodiments of the present invention may comprise introducing a treatment fluid that comprises an anionic polymer and a cationic surfactant into a portion of a subterranean formation at or above a pressure sufficient to create or enhance one or more fractures in the subterranean formation. "Enhancing" one or more fractures in a subterranean formation may include the extension or enlargement of one or more natural or previously-created fractures in the subterranean formation. In certain embodiments, particulates treated using a method of the present invention may be introduced into the subterranean formation as a component of a treatment fluid (e.g., a fracturing fluid or a gravel pack fluid) in one or more of these operations.

In certain embodiments, the present invention may be used to treat a mineral surface on a proppant particulate or a gravel particulate that may be used in a subsequent subterranean operation (e.g., a fracturing operation, a gravel packing operation, a "frac-pack" operation, etc.). In certain embodiments, pre-coated particulates of the present invention suitable for use in a subterranean operation may be formed. Such pre-coated particulates of the present invention generally comprise a particulate (e.g., a proppant particulate or a gravel particulate) and a film formed on a surface of the particulate by allowing an anionic polymer and a cationic surfactant to contact a surface on the particulate and to interact with each other. In these embodiments, the pre-coated particulates of the present invention may be formed at any time prior to introduction into a subterranean formation.

The particulates used in certain embodiments of the present invention may comprise any particulate material known in the art. Particulates may be comprised of any material suitable for use in subterranean operations. Examples include, but are not limited to, sand, bauxite, ceramic materials, glass materials (e.g., glass beads), polymer materials, TEFLON® (polytetrafluoroethylene) materials, nut shell pieces, seed shell pieces, cured resinous particulates comprising nut shell pieces, cured resinous particulates comprising seed shell pieces, fruit pit pieces, cured resinous particulates comprising fruit pit pieces, wood, and/or composite particulates. Composite particulates also may be used, wherein suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, and/or ground cellulose fiber. Typically, the particulates have a size in the range of from about 2 to about 400 mesh, U.S. Sieve Series. In particular embodiments, particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, the particulates may comprise fibrous materials that may be used, inter alia, to bear the pressure of a closed fracture.

The treatment of the mineral surface on a particulate may be performed prior to transporting the particulates to a job site, or it may be performed "on-the-fly." The term "on-the-fly" is used herein to mean that one flowing stream comprising particulates is continuously introduced into another flowing stream comprising the anionic polymer and/or the cationic surfactant so that the streams are combined and mixed while continuing to flow as a single stream as part of the on-going treatment at the job site. Such mixing can also be described as "real-time" mixing. One such on-the-fly mixing method would involve continuously conveying the particulates and the anionic polymer and/or the cationic surfactant to a mixing vessel, for example, using a sand screw. Once inside the mixing vessel, the particulates would be contacted with the anionic polymer and/or the cationic surfactant and continuously removed from the mixing vessel. In that situation, the sand screw could be used both to aid in mixing the particulates, be they gravel, proppant, or some other particulates, with the anionic polymer and/or the cationic surfactant and to remove the anionic polymer and/or the cationic surfactant from the mixing tank. As is well understood by those skilled in the art, batch or partial batch mixing may also be used to treat proppant and/or gravel particulates at a well site just prior to introducing the particulates into a subterranean formation.

In some embodiments, the anionic polymer and/or the cationic surfactant may be allowed to contact the mineral surface on a proppant particulate or gravel particulate by placing them in a solution and/or treatment fluid that comprises the particulate (e.g., a fracturing fluid or a gravel pack fluid), which may may be done prior to, during, or subsequent to introducing the proppant particulate or gravel particulate into a subterranean formation or well bore. Other suitable methods for allowing the anionic polymer and/or the cationic surfactant to contact the mineral surface of a particulate include, but are not limited to, methods utilizing a dry mixer and solvent extraction methods. In an embodiment of the present invention involving a solvent extraction technique, the anionic polymer and/or the cationic surfactant are diluted into a solvent or blend of solvents to provide certain fluid properties (e.g., viscosity) that facilitate transfer, metering, and mixing of the anionic polymer and/or the cationic surfactant with the particulates being treated. The solvents may comprise any solvent or solvents known in the art; in certain embodiments, the solvent may be chosen from those that are very water soluble. The solution comprising the anionic polymer and/or the cationic surfactant then may be coated onto the mineral surface of the particulates by adding the solution to the particulates and stirring (or mulling) until the mixture is uniform. The treated particulates then may be introduced to a fluid that extracts the solvent from the treated particulates, leaving behind the film. In some embodiments of the present invention, it may be desirable to perform some additional treatment or action on the particulate prior to, during, or subsequent to allowing the anionic polymer and/or the cationic surfactant to contact a mineral surface of the particulate. For example, the mineral surface of the particulate may be heated before the anionic polymer and/or the cationic surfactant is permitted to contact the mineral surface of the particulate.

In certain embodiments, the methods of the present invention further comprise allowing at least a portion of the film to dissolve. In these embodiments, the present invention may provide additional advantages since, as the film is dissolved (e.g., slowly over time), the mineral surface may be treated using a method of the present invention repeatedly with a lessened build-up of residual layers of the film that could, among other problems, reduce the conductivity of the subterranean formation where the mineral surface resides. Where the film is permitted to dissolve, the film may dissolve into, among other things, a portion of a treatment fluid placed in the subterranean formation, fluids (e.g., water) that occur naturally in the subterranean formation, or some combination thereof. In certain embodiments, the film formed on the mineral surface may dissolve after a period of time of about 90 to 120 days has passed after the film is formed. Thereafter, the mineral surface may be contacted with a second anionic polymer and a second cationic surfactant (either or both of which may be provided in a second treatment fluid), and the the second anionic polymer and the second cationic surfactant may interact so as to form second film on at least a portion of the mineral surface. In these embodiments, the second anionic polymer and second cationic surfactant may comprise the same polymer(s) and surfactant(s) used to form the first film, or they may comprise different polymers or surfactants.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite article "a", as used in the claims, is defined herein to mean to one or more than one of the element that it introduces. Also, the terms in the claims have their plain, ordinary meaning unless otherwise explicitly and clearly defined by the patentee.

What is claimed is:

1. A method comprising:
providing a fluid comprising an anionic polymer and a cationic surfactant, wherein the anionic polymer is an alkylpolyacrylamide homopolymer;
contacting a particulate with the anionic polymer and the cationic surfactant;
allowing the anionic polymer and the cationic surfactant to interact with each other to form a film on at least a portion of the particulate to form a pre-coated particulate; and
introducing the pre-coated particulate into a subterranean formation.

2. The method of claim 1 wherein the fluid further comprises a base fluid.

3. The method of claim 1 wherein at least one of the anionic polymer and the cationic surfactant is provided in a solution that further comprises a solvent.

4. The method of claim 1 wherein the fluid further comprises a second anionic polymer that comprises at least one anionic polymer selected from the group consisting of: a polyacrylate; a polyacrylic acid; 2-acrylamido-2-methylpropanesulfonic acid; a polyacrylamide; and any derivative thereof.

5. The method of claim 1 wherein the cationic surfactant comprises at least one cationic surfactant selected from the group consisting of trimethylcocoammonium chloride, trimethyltallowammonium chloride, dimethyldicocoammonium chloride, bis(2-hydroxyethyl)tallowamine, bis(2-hydroxyethyl)erucylamine, erucyl methyl bis(2-hydroxyethyl) ammonium chloride, bis(2-hydroxyethyl)coco-amine, cetylpyridinium chloride, N,N,N, trimethyl-1-octadecamonium chloride, a fatty amine salt, an ammonium salt, a quaternary ammonium compound, an alkyl pyridinium salt, and any derivative thereof.

6. The method of claim 1 further comprising allowing at least a portion of the film to dissolve.

7. The method of claim 6 further comprising:
providing a second anionic polymer and a second cationic surfactant;
contacting the pre-coated particulate with the second anionic polymer and the second cationic surfactant; and
allowing the second anionic polymer and the second cationic surfactant to interact, whereby a second film is formed on at least a portion of the pre-coated particulate.

8. The method of claim 1 wherein the anionic polymer is present in an amount from about 2% to about 5% by weight of the fluid.

9. A method comprising:
providing a fluid that comprises a solvent, an anionic polymer, and a cationic surfactant, wherein the anionic polymer is an alkylpolyacrylamide homopolymer;
contacting a particulate with the fluid to form a treated particulate;
contacting the treated particulate with an extractant to extract at least a portion of the solvent from the treated particulate to form a film on at least a portion of the particulate to form a pre-coated particulate;
introducing the pre-coated particulate into a subterranean formation; and
allowing at least a portion of the film to dissolve.

10. The method of claim 9 wherein the fluid further comprises a second anionic polymer that comprises at least one anionic polymer selected from the group consisting of: a polyacrylate; a polyacrylic acid; 2-acrylamido-2-methylpropanesulfonic acid; a polyacrylamide; and any derivative thereof.

11. The method of claim 9 wherein the method further comprises introducing a treatment fluid comprising the pre-coated particulate into a portion of the subterranean formation at or above a pressure sufficient to create or enhance at least one fracture in the subterranean formation.

12. The method of claim 9 wherein the method further comprises depositing a plurality of the pre-coated particulates in a fracture in a portion of the subterranean formation.

13. The method of claim 9 further comprising placing a plurality of pre-coated particulates in a portion of the subterranean formation to form a gravel pack near a well bore penetrating the subterranean formation.

14. The method of claim 9 further comprising heating the particulate before contacting the particulate with the fluid.

15. The method of claim 9 wherein the anionic polymer is present in an amount from about 2% to about 5% by weight of the fluid.

* * * * *